Nov. 2, 1965    F. LISSAU    3,215,044
HYDRAULIC POSITIONING SERVO SYSTEM
Filed July 24, 1962    4 Sheets-Sheet 1

INVENTOR.
FREDERIC LISSAU
BY
AGENT

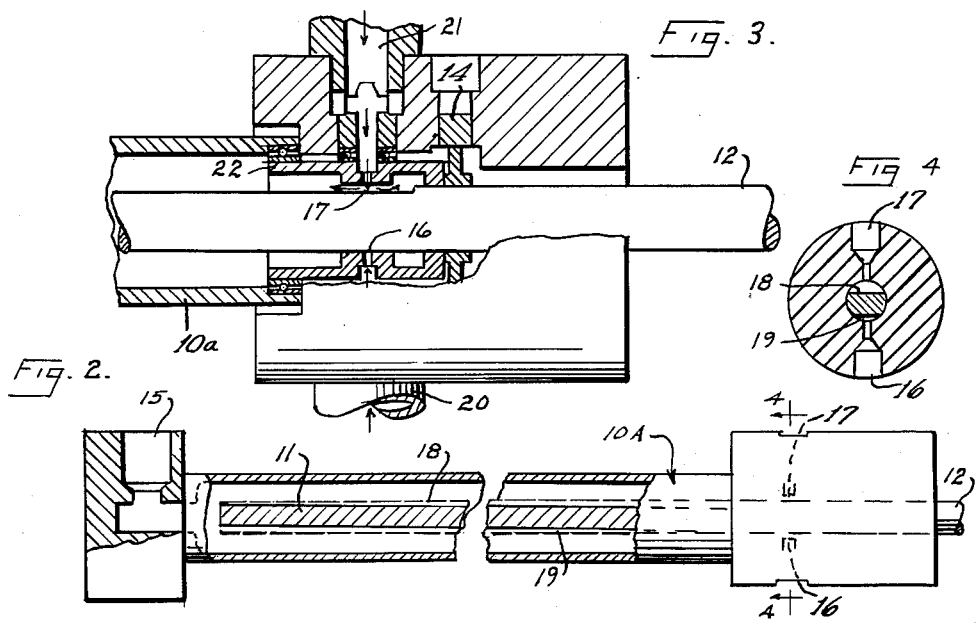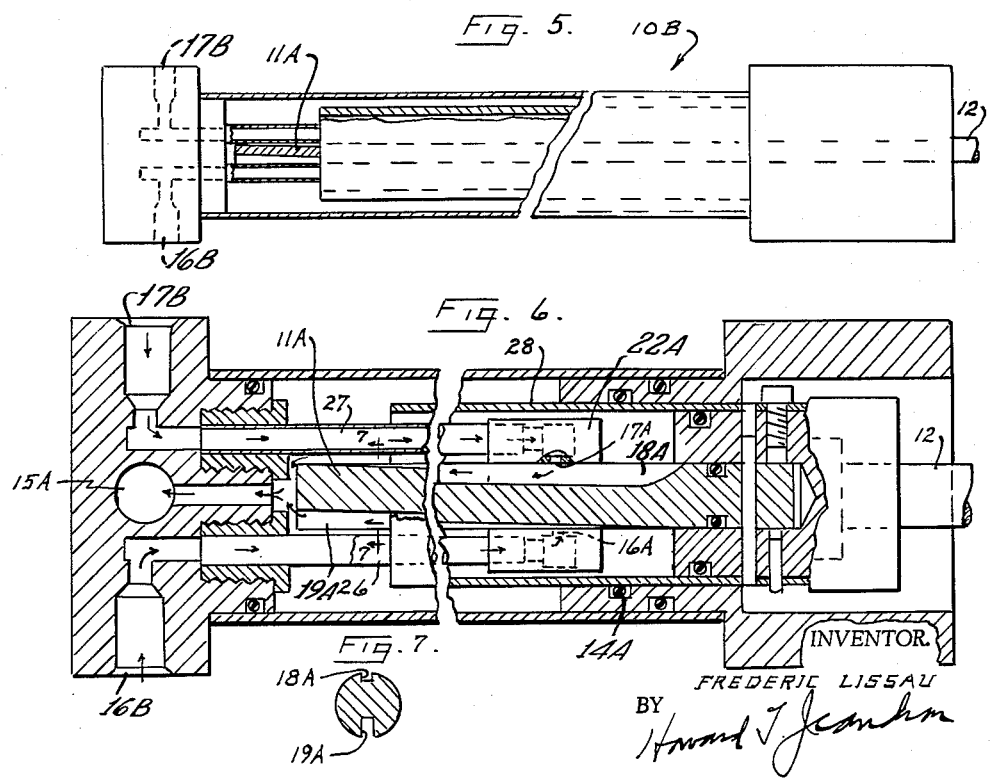

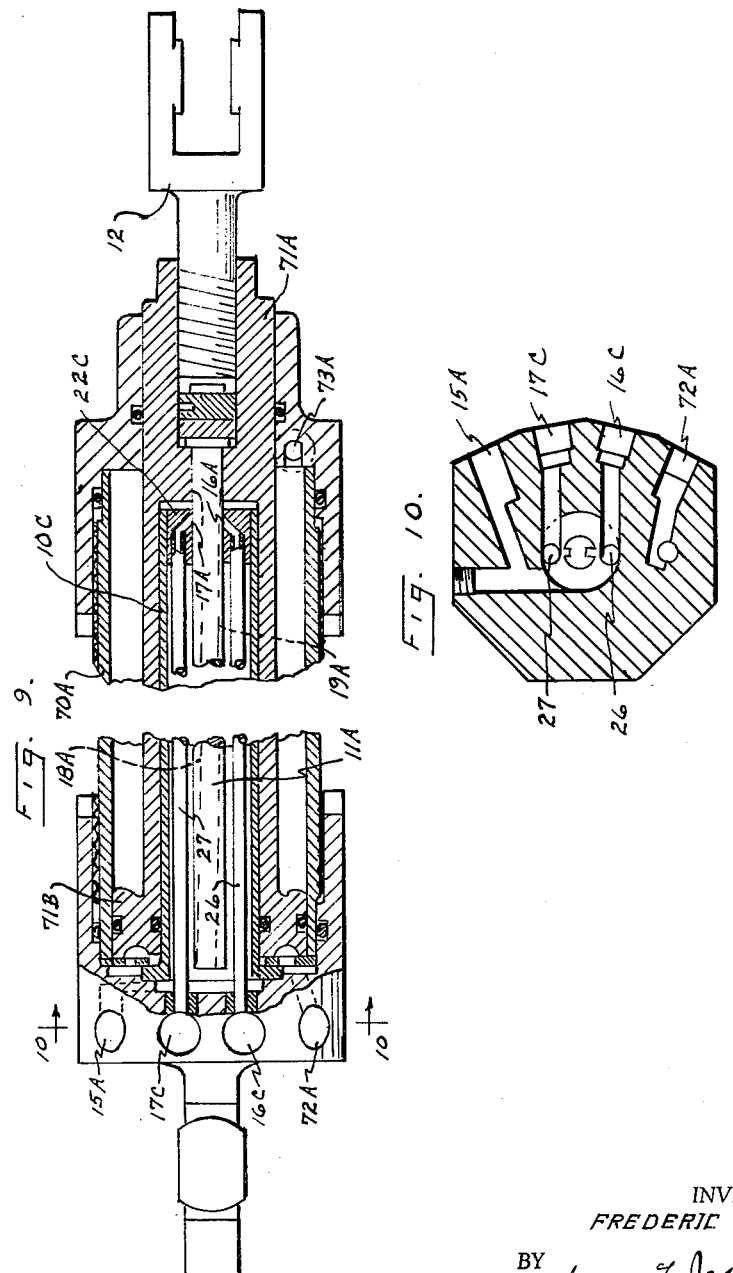

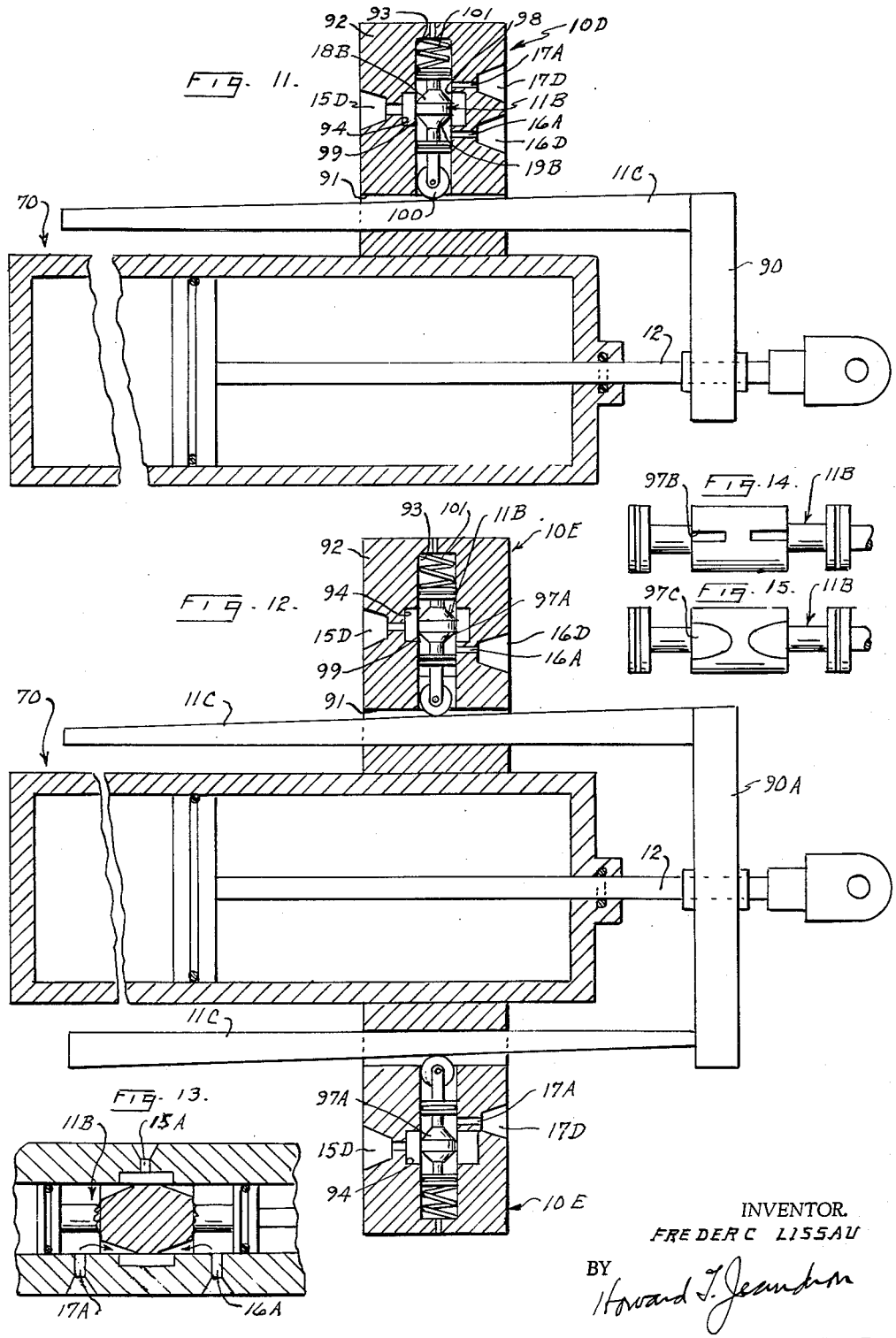

United States Patent Office 3,215,044
Patented Nov. 2, 1965

3,215,044
HYDRAULIC POSITIONING SERVO SYSTEM
Frederic Lissau, 24—15 27th St., Long Island City, N.Y.
Filed July 24, 1962, Ser. No. 212,069
6 Claims. (Cl. 91—388)

This is a continuation-in-part of my previous Patent No. 3,058,450 for Hydraulic Positioning Servo System. This invention relates to a hydraulic system for controlling apparatus and more particularly to a hydraulic positioning servo system.

The prior applications disclose, illustrate and define a "hydristor," a mechanical assembly such as a hydraulic cylinder with two linear resistances mounted therein, two fluid inlet pressure ports and a fluid return port. The linear resistances are fitted within the cylinder with enough clearance to allow a linear flow. The linear resistances are displaced as a function of output position. There are two complementary resistances created, R1 and R2. The hydristor in the first patent is a hydraulic cylinder with a linear piston therein whereas in the present invention (second application) the hydristor is a hydraulic chamber having a metering element to form two resistances. The metering pin is movable laterally in either direction to change the ratio of these resistances in relation to its position. Thus when the metering pin is moved in either direction to change ratio of resistances in a complementary manner, it will increase one resistance while decreasing the other when moved in one direction and vice versa when moved in the other direction. In the first application, the hydristor is in the form of a hydraulic cylinder which is necessarily longer than the power cylinder to which it is connected and in the present invention (second application) the hydristor is a cylinder, reservoir or a valve in which a metering pin is mounted and the cylinder reservoir or metering pin may be of the same length as the proper cylinder. In the first application the hydraulic flow is a capillary flow over the surface of the piston whereas in the present invention there is an orifice type of flow (mostly turbulent flow). The hydraulic cylinder in which the metering pin is mounted is only cylindrical in form because it contains and coacts with the metering pin and the stroke of the metering pin. Whereas in reality, the cylinder can take any shape as it is simply a reservoir for the return flow of the hydraulic fluid passing through the two variable orifices. The hydristor is in fact a valve which may take other shapes.

It is a further object of this invention to provide a hydraulic servo system in which there is provided a hydraulic cylinder with a linear metering pin therein, and in which a fluid pump is connected through a ratio flow divider to the two complementary resistances in the hydraulic cylinder.

A still further object of this invention is to provide a hydraulic servo system in which there is provided a hydraulic cylinder with a linear metering pin therein, and in which a fluid supply is connected through a ratio flow divider and the ratio flow divider in turn to a sensing null unit and in turn to two variable orifices in said hydraulic cylinder, and in which said metering pin is in turn connected to a piston in a power cylinder that is either in alignment, concentric, or in parallel relation or is connected by a mechanical means to the piston rod of said power cylinder, and a second fluid supply is connected through an amplifier valve to opposite ends of said power cylinder, and said amplifier valve controlled in its movement by the sensing element of the null unit.

A still further object of this invention is to provide a hydraulic servo system in which there is provided a hydraulic cylinder or valve with a linear metering pin therein, and in which a fluid supply is connected through a ratio flow divider and the ratio flow divider in turn to a sensing null unit and in turn to two variable orifices in said hydraulic cylinder or valve, and in which said metering pin is connected by a mechanical means to the piston of a power cylinder so that the position of the metering pin is a function of the displacement of the power cylinder piston, and a second fluid supply is connected through an amplifier valve to opposite ends of said power cylinder, and said amplifier valve controlled in its movement by the sensing element of the null unit.

A still further object of this invention is to provide a hydraulic servo system in which there is provided a hydraulic cylinder with a linear metering pin therein and within the cylinder there is provided means to produce two complementary flows, and in which a fluid supply is connected through a ratio flow divider to the means to produce the two complementary flows and a return port is connected to the cylinder.

A still further object of this invention is to provide a hydraulic servo system in which there is provided a reservoir or valve with a linear metering element therein and in which a fluid supply is connected through a ratio flow divider and the ratio flow divider in turn to a sensing null unit and in turn to two variable orifices in said reservoir and in which said metering pin is in turn connected to a piston in a power cylinder that is in alignment with said metering pin and a second fluid supply is connected through an amplifier valve to opposite ends of said power cylinder and said amplifier valve is controlled in its movement by the sensing element of the null unit.

Other objects of this invention shall be apparent by reference to the accompanying detailed description and the drawings in which:

FIG. 2 is a cross sectional view of a linear hydristor,

FIG. 3 is an enlarged cross sectional view of one end of FIG. 2,

FIG. 4 is a cross sectional view taken on line 4—4 of FIG. 2,

Figure 8:
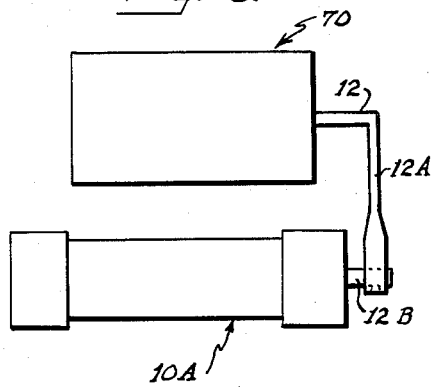

FIG. 5 is a side elevational view partially in cross section of a further embodiment of a linear hydristor, FIG. 6 is an enlarged detail in cross section of both ends of FIG. 5, FIG. 7 is a cross sectional view taken on line 7—7 of FIG. 6, FIG. 8 is a schematic of a further embodiment of this invention, FIG. 9 is a further embodiment in which the hydristor is mounted concentrically within the power cylinder, FIG. 10 is a cross sectional view taken on line 10—10 of FIG. 9, FIG. 11 is a further embodiment in which the hydristor is mechanically connected to the power cylinder, and FIG. 12 is a still further embodiment similar to FIG. 11 in which the hydristor is divided into two components.

FIG. 13 is a further modification of the metering pin shown in FIG. 11.

FIG. 14 illustrates the metering pin of FIG. 13 with tapered slots, and

FIG. 15 illustrates the metering pin with tapered flats.

Figure 1:
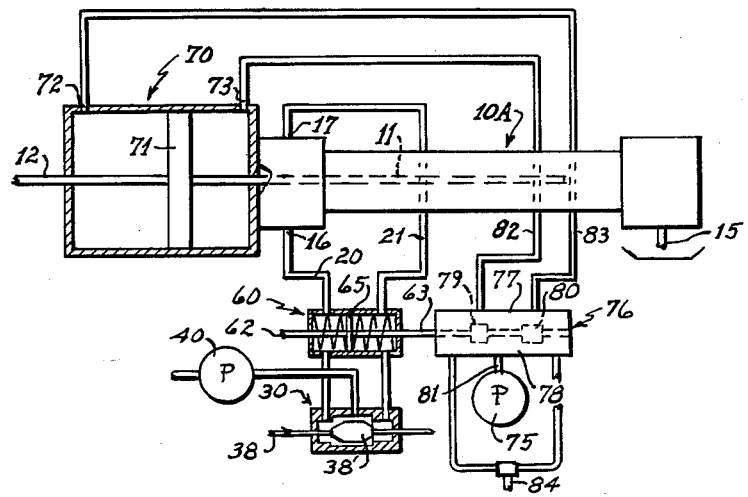
FIG. 1 is a schematic of a load compensated power system.

Referring to the drawings and particularly FIGS. 1, 2 and 3, there is illustrated a hydraulic cylinder 10A in which there is mounted a metering pin or element 11 and also within the cylinder there is provided an outlet port 15 at one end and a pair of inlet orifices 16 and 17 at the opposite end of said cylinder. The metering pin is connected to a piston rod 12 that extends beyond said hydraulic cylinder passing through a rod seal or aperture 14 (FIG. 3) at one end of said cylinder.

It is to be noted that the metering pin 11 is fitted closely to the bore of bushing 22 and is provided with two tapered flats 18 and 19 that are inversely tapered. Due to the means of mounting the metering pin 11, it will be maintained on a central axis of the cylinder and due to the piston rod 12, the metering pin 11 will be positioned by the power cylinder and will move in either direction depending upon the unbalance created by the flow divider and null unit (FIG. 1). The flats in the metering pin 11 and the inner wall or bore of the bushing 22 are to permit the flow of the hydraulic fluid from the orifices 16 and 17 over the surface of the flats of the metering pin and out through the outlet port 15. The tapered flats of the metering pin are provided to vary the orifice flow. The tapered flats 18 and 19 are in parallel relationship over the length of the pin to form the complementary resistances at the orifices 16 and 17. However, it is to be noted that when the pin is in a central balanced position, the turbulent flow from orifices 16 and 17 to the return port will be equal but with the movement of the metering pin 11 to the right, FIG. 2, the flow through orifice 16 onto flat 19 increases while the flow through orifice 17 onto flat 18 decreases due to the taper of the flats in the metering pin. And vice versa if the metering pin is moved in the opposite direction, the flow through orifice 16 to flat 19 decreases while the flow through orifice 17 to flat 18 increases. This cylinder as described shall be referred to hereinafter as the hydristor, hydristor being a coined word may be defined as a mechanical assembly such as a hydraulic cylinder or a value with a metering pin mounted therein to form two complementary resistances, two fluid inlet orifices at one end of the cylinder and a fluid return port. The metering pin is fitted within the cylinder with flats to allow a flow from the orifices to flow past the metering pin. The metering pin member is displaced as a function of output position either direct or through intermediate mechanical means, there are two complementary resistances created, R1 and R2; their ratio $R1/R2$ is therefore a function of output position. Each of the resistances is connected in series, that is, through the legs or pipes to opposite ends of the ratio flow divider 30 with similar resistances $r1$ and $r2$, which are created in the same order in the ratio flow divider as a function of input position, so that the pressure $p1$ and $p2$ in the legs or pipe connections 20 and 21 equal each other if $R1/R2=r1/r2$. Thus, it is the purpose of the hydristor to utilize the pressure differential $p1$ and $p2$ as a remote input signal or error signal. Since the pressures $p1$ and $p2$ are created by the input setting of $r1/r2$, it would be equally correct to state that the ratio $r1/r2$ is used as the input signal, and the pressure differential between $p1$ and $p2$ as the error signal. When the pressure drop across the orifices in flow divider 30 as well as across each of the orifices 16 and 17 and their coacting flat surfaces 18 and 19 is equal, the servo valve 76 will be in equilibrium. It is apparent that as the pressure drop across one orifice of the flow divider as well as one orifice of the hydristor increases, the pressure drop across the other orifice of the flow divider and the other orifice of the hydristor decreases and the servo valve is displaced to meter the fluid to the cylinder 70 and the piston 71 is moved to a new position.

It is to be noted that with the non-position seeking type of hydristor, the metering pin is fitted within a closely lapped bushing or bore 22 which contains two apertures that are the orifices 16 and 17. The two apertures mating with the metering pin provide the two complementary resistances to the fluid flow. The metering pin 11 is provided with two tapered flat surfaces 18 and 19 that coact with the two apertures 16 and 17 to control the ratio of the complementary flows. The orifice flow produces a leakage or seepage of the fluid through the opening created by the flats in the metering pin which is in reality the means of producing the ratio of the flow from the two orifices. The fluid that is normally fed in through lines 20 and 21 to the orifices 16 and 17 will flow from each orifice over the coacting flats toward the outlet port 15 providing complementary hydraulic resistances whose ratio is a function of the displacement of the moving member (metering pin 11). The hydristor does not provide any effective pressure areas. A hydraulic resistance could be defined as follows:

R _____ Hydraulic resistance.
P _____ Pressure differential.
Q _____ Flow in gallons per minute.

$d=$ Diameter of orifice
$A=$ Area of orifice (1) $$R=\sqrt{\frac{\Delta P}{Q}} \text{ Definition}$$

Flow thru an orifice is (2) $$Q=K_1 d^2 \sqrt{\Delta P}$$

Whereby $K_1$ is a constant containing specific gravity and orifice coefficient (3) $$R=\frac{\sqrt{\Delta P}}{K_1 d^2 \sqrt{\Delta P}}=\frac{1}{K_1 d^2}$$

$$\text{if } \frac{1}{K_1}=K$$

(4) $$R=\frac{K}{d^2}=\frac{\frac{K}{4}\pi}{A}$$

The hydraulic resistance is inversely proportional to the second power of the orifice diameter or to the first power of the orifice area.

A ratio of 2 resistances $R1/R2$ (5) $$\frac{R_1}{R_2}=\frac{\frac{K}{d_1^2}}{\frac{K}{d_2^2}}=\frac{d_2^2}{d_1^2}=\frac{A_2}{A_1}$$

that is a ratio of resistances that is independent of $K$, which contains specific gravity and orifice coefficient. It is this resistance ratio which is being compared in the hydristor circuit. Referring to FIG. 1 there is illustrated a schematic of a servo system utilizing the linear type hydristor 10A as a feedback element. This is comprised of the cylinder 10A with the metering pin 11 therein, also a power cylinder 70 with a piston rod 12. Connected to its orifices 16 and 17 is a ratio flow divider 30 and the ratio flow divider in turn being connected to a pump 40. The ratio flow divider 30 is provided with an actuator signal input rod 38 which is connected to the central dividing element or valve 38' of the ratio flow divider 30. This becomes the control element for the complete system. However in this instance the two fluid lines connecting orifices 16 and 17 to the flow divider 30 are provided with a null unit 60. The null unit is in the form of a single enclosed cylinder with a spring centered piston 65, the intercepted lines 20 and 21 passing into either end of the cylinder 60 and out of cylinder 60 at either end to the flow divider 30. The single piston 65 is positioned in the center of cylinder 60 to maintain the divided fluid flow through both ends of the cylinder but respond to any unbalance of pressure in either end. Piston 65 is also provided with a pair of piston rods 62 and 63 which extend through and out of either end of cylinder 60. It is apparent that piston 65 becomes a sensing element that is moved in either direction depending upon the pressures on either side of said piston and such movement is reproduced by the piston rods 62 and 63.

In FIG. 1 it is to be noted that the metering pin 11 may be split into two pins 11 each one having a slanted surface, it is also to be noted that one end of cylinder 10A is joined to an enlarged power cylinder 70, the power cylinder 70 being provided with a piston 71 and two ports 72 and 73 at either end of said cylinder. It is also to be noted that the piston rod 12 of cylinder 70 extends through the power cylinder and is affixed to the piston 71. The piston rod 12 is also connected to the metering pin 11 of the hydristor. The power cylinder 70 is also connected by means of its ports 72 and 73 to a power hydraulic pump 75, that is, hydraulic fluid under high pressure and proper volume is supplied by this pump 75 through an amplifier valve 76. Valve 76 is a four ported valve with a closed cylindrical bore 77 and a valve casing 78. Valve casing 78 retains two pistons 79 and 80 fitted to the cylindrical bore but connected by a central core of less diameter. The fluid from said pump 75 passes through an inlet 81 at the center of said valve to surround the lesser diameter of the piston. With the piston of valve casing 78 in its central position, the outlet ports 82 and 83 are closed. Valve casing 78 is also connected by the rod 63 extending through the body and attached to rod 62 of the null unit 60. Thus, with movement of piston 65 of the null unit 60, the double piston of valve casing 78 of valve 76 may be moved in either direction, for example if moved to the left, it will open port 82 to permit a flow of fluid from pump 75 through valve 76, through port 82, to inlet port 73 of the power cylinder. The opposite side of the power cylinder will expel fluid through port 72, through the opposite line to the opposite port 83 of valve 76, which is in turn connected to return port 84. Similarly, if the double piston of valve casing 78 had been moved in the opposite direction, fluid would be expelled through the return port 82.

Referring to FIGS. 5 and 6 there is illustrated a further embodiment of the hydristor in the form of a hydraulic cylinder 10B. As in the prior embodiment, there is mounted within the cylinder a metering pin 11A and also within the cylinder there is provided an outlet port 15A and a pair of inlet ports 16B and 17B. It is to be noted that the metering pin 11A is fitted within the cylinder 10B and is connected to the piston rod 12. The metering pin 11A is closely fitted to be mounted in a bore in bushing 22A and the metering pin 11A is provided with two tapered slots 18A and 19A that are inversely tapered. Due to the means of mounting the metering pin 11A it will be maintained on a central axis of the cylinder and due to the piston rod 12, the metering pin 11A will be positioned by the power cylinder and will move in either direction depending upon the unbalance created by the flow divider and null unit (FIG. 1). The bushing 22A is positioned in a fixed relation to cylinder 10B. Located within bushing 22A are a pair of opposed orifices or inlet ports, 16A and 17A. Orifice 16A is directed into a slot 19A while orifice 17A is directed into a slot 18A. Orifice 16A is connected by a pipe 26 to the inlet port 16B while orifice 17A is connected by a pipe 27 to the inlet port 17B. The metering pin 11A at one end is connected to the piston rod 12. Also at the same end, the metering pin 11A is connected to a surrounding shell 28. Shell 28 on its exterior is provided with a plurality of seals to permit shell 28 to be slidably moved into and out of cylinder 10B with the movement of piston rod 12. Shell 28 surrounds bushing 22A and the metering pin 11A. Thus with the flow of fluid through ports 16B and 17B through the orifices 16A and 17A, the fluid cannot flow toward the open or operating end of cylinder 10B but the fluid can flow along slots 18A and 19A to the opposite end of the cylinder and out the outlet port 15A. In this embodiment the orifices 16A and 17A and the metering pin are completely enclosed and protected by shell 28 during the reciprocal movement of the piston rod 12 and metering pin 11A.

Referring to FIG. 8 there is illustrated a further embodiment of this invention in which the power cylinder 70 and the hydristor 10A are positioned in parallel relationship and in which the piston rod 12 is formed as a yoke with its connecting ends 12A connected to a rod 12B and in this instance the metering pin 11 of the cylinder or hydristor 10A is connected to the rod 12B. Thus the yoke provides an integral fixed connection between rods 12 and 12B so that both rods are synchronized in their movement.

The operation of this unit according to FIGS. 1 and 2 may be followed starting with the actuation of the signal input rod 38. Movement of the input rod 38 will change the fluid flow to cylinder 10A, that is, movement of the rod 38 to the right or left unbalances the balanced flow. Assuming that rod 38 is moved to the right, the greater flow will be to port 16 and surface 19 and the lesser flow to port 17 and surface 18. At the same time the null unit 60 is also affected by the unbalance and diaphragm 65 will move to the right, thus rod 63 will move to the right affecting the piston 78 of the valve 76. And fluid pressure from pump 75 will pass through and around the piston 78 through port 83 to port 72 to the left side of the power cylinder to move piston 71 to the right and rod 12 connected thereto to the right thus moving the metering pin 11 in the same direction until a position of the metering pin is reached at which the fluid pressures are again balanced and the null unit responds to the balance of pressures to restore valve 76 to a balanced position and thus establish the degree of input signal imposed with rod 38. A movement of rod 38 in the opposite direction produces the movement of the power cylinder and of the metering pin in the opposite direction until a balance is again created. The signal input valve 38' creates two complementary resistances as a function of position, $r1$ and $r2$; it also creates two flows, $Q1$ and $Q2$. This flow also creates two internal pressures on effective areas of null unit to sense the pressure differential $P1$ and $P2$. Thus, this invention takes advantage of the pressure differential $P1-P2$ in conjunction with the hydraulic element which we call a hydristor, as the feedback criterion for control of the position and load of an actuator. Substituting the embodiment illustrated in FIGS. 5 and 6 for the embodiment illustrated in FIGS. 2 and 3 does not not change the operation of the device as the metering pin 11A will operate in an identical fashion to metering pin 11 and the complementary resistances created by orifices 16A and 17A are identical to the complementary resistances by orifices 16 and 17 and the fluid flow from the orifices to the outlet port 15 is identical. The only difference in this embodiment over the prior embodiment is in the manner of enclosing the bushing retaining the orifices with an additional shell 28 and positioning the inlet ports at the opposite end of the cylinder.

Referring to FIGS. 9 and 10 there is illustrated a further embodiment of this invention showing a linear hydristor 10C in which the hydristor is mounted concentrically within the power cylinder 70A. The hydristor 10C may be similar in form to the hydristor in the prior embodiment, FIGS. 5 and 6, with a metering pin 11A, an outlet port 15A, and a pair of inlet ports 16C and 17C. The metering pin 11A is similarly fitted within the cylinder 10C and is connected to the piston rod 12. The metering pin 11A is provided with two tapered slots 18A and 19A that are inversely tapered and as in the prior embodiment the pin 11A is maintained on a central axis of the cylinder and due to the piston rod 12 the metering pin 11A will be positioned by the movement of piston rod 12 with relation to the power cylinder moving in either direction and depending upon the unbalance created by the flow divider and null unit as in FIG. 1. At one end of the cylinder 10C there is a bushing 22C. This bushing is positioned in a fixed relation to cylinder 10C. Located within bushing 22C is a pair of opposed orifices or inlet ports 16A and 17A. Orifice 16A is directed into slot 19A while orifice 17A is directed into slot 18A.

Orifice 16A is connected by a pipe 26 to the inlet port 16C while orifice 17A is connected by a pipe 27 to the inlet port 17C. The metering pin 11A at one end is connected to the piston rod 12. Also at the same end the metering pin 11A is connected to a surrounding piston rod 71A so that piston rod 12, metering pin 11A and piston rod 71A all reciprocate in a linear movement as an integral unit. Piston rod 71A at one end is provided with a piston end 71B fitted within the power cylinder 70A. The power cylinder 70A is connected by means of its ports 72A and 73A to a power hydraulic pump as in the embodiment of FIG. 1. It is apparent that with fluid pressure from the pump entering port 73A due to the piston head 71B the entire piston and its component attached parts will move to the left, FIG. 9, while if fluid pressure is supplied from the pump through port 72A the piston 71B and its components attached parts will move to the right, FIG. 9. Movement of piston 71B in either direction provides movement of the metering pin 11A which in turn affects the fluid flow through orifices 16A and 17A as already described. This embodiment is similar in every sense in its operation to the previous embodiments. The only difference in this embodiment over the prior embodiment is in the manner of enclosing the hydristor within the power cylinder so that the hydristor operates with the piston of the power cylinder.

Referring to FIG. 11 there is illustrated a further embodiment of this invention showing a power cylinder 70 similar to that illustrated in the prior embodiments and the power cylinder is provided with a piston rod 12 which extends through the cylinder 70. Mounted on one side of the power cylinder 70 there is a hydristor 10D. A mechanical yoke 90 is affixed to the end of the piston rod 12 and affixed to a tapered cam 11C which is retained in a parallel relationship with the piston rod 12 and the tapered cam 11C extends through an aperture 91 in the hydristor 10D. The hydristor 10D is illustrated in another modification in this embodiment in fact it resembles a double faced poppet valve providing a pair of opposed conical surfaces. The hydristor 10D is comprised of a casing 92 having a central bore 93, the central bore 93 is provided with an enlarged central bore 94. Mounted within the bore 93 is a metering pin 11B. The metering pin 11B at its center is provided with two tapered, slanted, or conical surfaces 18B and 19B. The opposed conical surfaces are positioned within the enlarged bore 94 to move toward or away from the poppet valve seats 98 or 99 according to the movement of metering pin 11B, that is, if the metering pin is moved upward, FIG. 11, the resistance to the flow through orifice 17A increases while the resistance to the flow of orifice 16A decreases whereas if the metering pin 11B moves downward, the resistance to the flow through orifice 17A decreases while the resistance to the flow of orifice 16A increases. The opposed conical surfaces are used to control the flow of fluid through orifices 16A and 17A, orifice 16A being connected to port 16D while orifice 17A is connected to port 17D. The enlarged bore 94 is in turn connected to a return port 15D. The movement of the opposed conical surfaces are utilized to vary the resistance to the flow of the orifices. The manner in which the opposed conical surfaces are moved is dependent upon the tapered cam 11C, that is, at the end of metering pin 11B there is a roller 100 resting upon the surface of the tapered cam while the opposite end of metering pin 11B is provided with a resilient element or spring 101, thus spring 101 retains the metering pin 11B in its rolling contact with the tapered cam 11C. As cam 11C is moved to the right, FIG. 11, metering pin 11B will drop downward increasing the resistance at orifice 16A and decreasing the resistance at orifice 17A and of course if cam 11C is moved in the opposite direction left, FIG. 11, metering pin 11B is moved upward and this will increase resistance at orifice 17A and decreases resistance at orifice 16A. Thus this embodiment of the hydristor functions in a similar manner to the hydristors described in the prior embodiments.

Referring to FIG. 12 there is illustrated a further embodiment of this invention showing a power cylinder 70 similar to that illustrated in the prior embodiments and the power cylinder is provided with a piston rod 12 which extends through the cylinder 70. Mounted on opposite sides of the power cylinder 70 there are a pair of hydristors 10E. A mechanical yoke 90A is affixed at its center to the end of the piston rod 12 and it is affixed at its opposite ends to a pair of oppositely tapered cams 11C which are retained in a parallel relationship to the piston rod 12 and each tapered cam or metering pin 11C extends through an aperture 91 of its related hydristors 10E. The hydristors 10E are illustrated in another modification in this embodiment similar to the embodiment of FIG. 11 in fact each hydristor resembles a poppet valve. Each hydristor 10E is comprised of a casing 92 having a central bore 93, the central bore 93 is provided with an enlarged central bore 94. Mounted within the bore 93 is a metering pin 11B. The metering pin 11B at its center is provided with a conical surface 97A. The conical surface 97A is positioned within the enlarged bore 94 to move toward or away from the valve seat 99 according to the movement of metering pin 11B, that is if the conical surface is moved toward the valve seat 99, the resistance to the orifice flow increases while if the conical surface is moved away from the valve seat 99 the resistance to the orifice flow decreases. The one hydristor is used to control the flow of fluid through orifice 16A while the other hydristor is used to control the flow of fluid through orifice 17A, orifice 16A being connected to port 16D while orifice 17A is connected to port 17D. The enlarged bores 94 are in turn connected to the return port 15D. The movement of the opposed poppet valves in the opposed hydristors is utilized to vary the resistance to the flow of the orifices. The manner in which the opposed poppet valves are moved is dependent upon the tapered cams 11C, that is at the end of metering pin 11B in each case there is a roller 100 resting upon the surface of each tapered cam while the opposite end of metering pin 11B is provided with a resilient element or spring 101, thus spring 101 retains metering pin 11B in its rolling contact with the tapered cam 11C. As the cams 11C are moved to the right, FIG. 12, metering pin 11B of the upper hydristor 10E will drop downward, while metering pin 11B of the lower hydristor 10E will also move downward. Thus the resistance at orifice 16A will be increased while the resistance at orifice 17A will be decreased and of course if cam 11C is moved in the opposite direction left, FIG. 12, metering pin 11B of the upper hydristor is moved upward and metering pin 11B of the lower hydristor is also moved upward and this will decrease resistance at orifice 16A and increase resistance at orifice 17A. Thus this embodiment of the hydristor functions in a similar manner to the hydristors described in the prior embodiments.

Referring to FIGS. 13, 14 and 15 there is illustrated a further embodiment of the metering pin 11B illustrated in FIG. 11. In this embodiment instead of providing opposed conical surfaces there are provided a pair of opposed slots 97B as shown in FIG. 14 or opposed slanted flats 97C as shown in FIG. 15. Otherwise, the metering pin 11B operates similarly to that described in FIG. 11 except in the modification shown in FIGS. 13, 14 and 15, the metering pin 11B must be positioned so that the slots 97B or the flats 97C positioned in opposed relationship as shown in FIG. 13 are retained in alignment with the orifices 16A and 17A.

Although applicant has described the hydraulic interactions which occur when an input signal is applied to the signal input valve, we must, however, also consider what occurs when a load is applied to the power cylinder. In this instance, the hydristor acts as the signal input valve.

The hydristor upon being displaced an increment by the applied load unbalances the central circuit such that the pressure difference between P1 and P2 causes the null unit to move the servo valve to deliver fluid from pump 75 (FIG. 1) to compensate the power cylinder against displacements caused by any externally applied load.

This fact establishes the inter-relation between signal input valve 30 and hydristor 10A.

Although applicant is primarily interested in a hydraulic servo system similar to that illustrated in the prior application, this continuation is to modify the servo system utilizing a different form of hydristor without departing from the spirit of this invention and although I have shown the ratio flow divider as a signal input unit for positioning the hydristor I may reverse their relationship, that is, the pump in this instance would be connected directly to the port 15 of cylinder 10A and the fluid flow would become a reversal of that disclosed in FIG. 1 without departing from the spirit of this invention and this invention shall be limited only by the appended claims.

What is claimed is:

1. A hydraulically positioned servo system which includes a hydristor as a position feedback element, said hydristor comprising a casing with a fluid chamber having two inlet ports each with an orifice and a metering element mounted therein, said inlet ports connected to said orifices, said metering element being fitted and positioned within said fluid chamber and provided with two oppositely slanted surfaces, said oppositely slanted surfaces positioned between said orifices to form two variable openings, said variable openings providing two complementary hydraulic resistances to allow two complementary fluid flows over said metering element and through said chambers in said casing to a common outlet, said servo system divided into a power stage and a feedback control stage, said power stage comprising a power cylinder and piston, a main pressure source and a four way valve, said four way valve connected by fluid lines to said power cylinder, said feedback control stage comprising said hydristor, an auxiliary pressure source, a ratio flow divider serving as a signal input valve to provide two complementary fluid flows and two complementary resistances, a differential pressure sensing device which is mechanically connected to said four way valve and connected by fluid lines to said ratio flow divider and to said hydristor, said four way valve connected to said main pressure source and comprising a valve body with a central axially movable piston having fluid flow controlling lands thereon to separate and guide said fluid flow to either side of said power cylinder, said hydristor having its metering element mechanically connected to the moving piston of said power cylinder as a feedback element, said ratio flow divider comprising a closed casing with a fluid inlet port at its center and two fluid outlet ports one at each end of said casing, a piston and rod mounted loosely and centrally within said closed casing to produce two complementary fluid flows similar to the two complementary flows produced in said hydristor, said rod providing the means for a mechanically produced input signal, said piston rod extending through said cylinder, said piston providing a metering effect to generate two complementary hydraulic resistances and to effect two complementary flows, said differential pressure sensing device comprising a closed cylinder with two fluid inlet ports and two fluid outlet ports and a piston, one inlet and one outlet port connected to each end of said closed cylinder to allow a fluid flow therethrough, and a resilient element positioned on each side of said piston to normally retain said piston centered when said fluid pressure on each side of said piston is equal, said piston of said differential pressure sensing device connected to said piston of said four way valve to control its movement and in turn control the fluid flow to said power cylinder, said differential pressure sensing device providing means to compare the ratio of the two complementary resistances of the hydristor with the ratio of the two complementary resistances of the signal input valve during fluid flow, said differential pressure sensing device which includes said resilient elements also responding to pressure changes to move said four way valve to correct an error signal when a pressure differential exists in said differential sensing device by moving said four way valve in the direction indicated by the error signal and in turn move said piston of said power cylinder and said metering element of said hydristor to reduce said error signal to zero.

2. A hydraulically positioned servo system according to claim 1 in which the fluid flow is divided by the controlling ratio flow divider into two complementary fluid flows which are connected to flow through each end of said differential pressure sensing device and in turn connected to both of the inlet ports and the orifices of said hydristor so that the ratio of hydraulic resistance created is a function of input position.

3. A hydraulically positioned servo system according to claim 1 in which the two complementary fluid flows created by the ratio flow divider are each passed through either end of said differential pressure sensing means and in turn to both inlet orifices of said hydristor so that the flows are exhausted through said orifices over said two oppositely slanted surfaces, said differential pressure sensing means positioning said four way valve to regulate the flow of fluid from the main pressure source to the power cylinder proportional to the pressure differential effect of the complementary flows through the hydristor, said hydristor ratio of variable opening between said orifice and said slanted surface is determined by the position of the moving metering element of the hydristor which is mechanically connected to the piston of the power cylinder.

4. In a hydraulically positioned servo system according to claim 1 in which the hydristor is positioned in a parallel relation with the power cylinder so that the piston rod of said power cylinder and the metering element of said hydristor are also in a parallel relationship and are integrally joined to operate in unison.

5. In a hydraulically positioned servo system according to claim 1 in which the hydristor is concentrically positioned with the power cylinder so that the piston rod of said power cylinder and the metering pin of said hydristor are integrally joined to operate in unison.

6. A hydraulically positioned servo system which includes a hydristor as a position feedback element, said hydristor comprising a casing with a fluid chamber having two inlet ports each with an orifice and a metering element mounted therein, said inlet ports connected to said orifices, said metering element being fitted and positioned within said fluid chamber and provided with two metering surfaces, said metering surfaces positioned between said orifices to form two variable openings which react in complementary relationship such that the ratio of hydraulic resistance created by the orifices are a function of output position, said variable openings providing two complementary hydraulic resistances to allow two complementary fluid flows over said metering element and through said chambers in said casing to a common outlet, said servo system divided into a power stage and a feedback control stage, said power stage comprising a power cylinder and piston, a main pressure source and a four way valve, said four way valve connected by fluid lines to said power cylinder, said feedback control stage comprising said hydristor, an auxiliary pressure source, a ratio flow divider serving as signal input valve to provide two complementary fluid flows and two complementary resistances, a differential pressure sensing device which is mechanically connected to said four way valve and connected by fluid lines to said ratio flow divider and to said hydristor, said four way valve connected to said main pressure source and comprising a valve body with a central axially movable piston having fluid flow controlling lands therein to separate and guide said fluid flow to either side of said power cylinder, said hydristor having its metering element mechanically connected to the moving piston of said power cylinder as a feedback element, said ratio flow divider comprising a closed casing with a fluid inlet port at its center and two fluid outlet ports, one at each end of said casing, a metering element mounted within said closed casing to produce two complementary fluid flows similar to the two complementary flows produced in said hydristor, said metering element providing the means for a mechanically produced input signal, said metering element generating two complementary hydraulic resistances such that the ratio of hydraulic resistance created is a function of input position, said ratio flow divider effecting two complementary flows, said differential pressure sensing device comprising a closed cylinder with two fluid inlet ports and two fluid outlet ports and a control element, one inlet and one outlet port connected to each end of said closed cylinder to allow a fluid flow therethrough, and a resilient element positioned on each side of said control element to normally retain said control element centered when said fluid pressure on each side of said element is equal, said control element of said differential pressure sensing device connected to said piston of said four way valve to control its movement and in turn control the fluid flow to said power cylinder, said differential pressure sensing means providing means to compare the ratio of the two complementary resistances of the hydristor with the ratio of the two complementary resistances of the signal input valve during fluid flow and correcting an error signal when a pressure differential exists in said differential sensing device by moving said four way valve in the direction indicated by the error signal and in turn move said piston of said power cylinder and said metering element of said hydristor to reduce said error signal to zero.

References Cited by the Examiner

UNITED STATES PATENTS

| | | |
|---|---|---|
| 787,136 | 4/05 | Warren. |
| 2,251,729 | 8/41 | Bach. |
| 2,287,810 | 6/42 | Lund _____ 137—625.4 X |
| 2,383,215 | 8/45 | Reynolds _____ 137—625.4 X |
| 2,394,384 | 2/46 | Horstman. |
| 2,709,421 | 5/55 | Avery. |
| 2,742,923 | 4/56 | Show _____ 137—625.4 |
| 2,802,484 | 8/57 | Sheets _____ 137—625.4 |
| 2,984,213 | 5/61 | Stiglic et al. |
| 2,998,804 | 9/61 | Clement. |

FOREIGN PATENTS

| | | |
|---|---|---|
| 423,676 | 1/26 | Germany. |

FRED E. ENGELTHALER, *Primary Examiner.*